Figure 8:
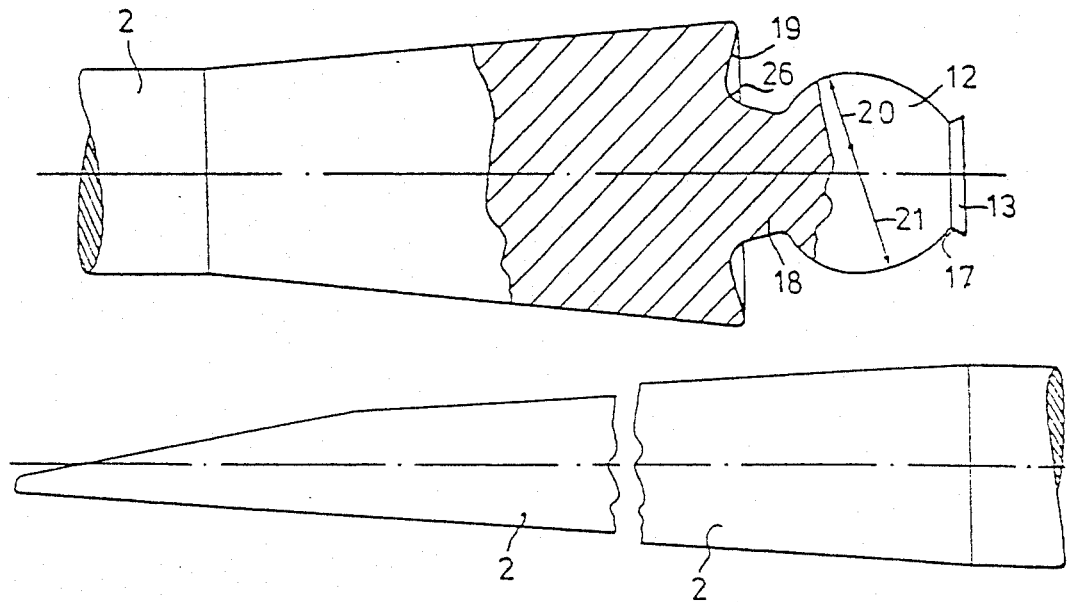

United States Patent [19]

Fleischanderl

[11] Patent Number: 4,858,298
[45] Date of Patent: Aug. 22, 1989

[54] ARRANGEMENT FOR MOUNTING DISK WHEELS ON MOTOR VEHICLES

[76] Inventor: Robert Fleischanderl, 4 Atschreithstrasse, A-3340 Waidhofen an der Ybbs, Austria

[21] Appl. No.: 171,959

[22] Filed: Mar. 23, 1988

[30] Foreign Application Priority Data

Mar. 23, 1987 [AT] Austria ................................ 683/87

[51] Int. Cl.$^4$ ............................................. B25B 27/14
[52] U.S. Cl. ..................................................... 29/273
[58] Field of Search ................. 29/273, 271, 270, 267; 403/351, 115, 122; 411/432, 178, 222, 931, 371, 372, 373, 431, 374, 377, 512, 907, 908; 301/9 DN, 36 R

[56] References Cited

U.S. PATENT DOCUMENTS

| | | | |
|---|---|---|---|
| 1,807,167 | 1/1925 | Nelson | 301/36 R |
| 1,969,233 | 8/1934 | Patterson | 29/273 |
| 1,999,206 | 4/1934 | Patterson | 29/273 |
| 2,321,414 | 6/1943 | Parker | 411/908 |
| 2,859,060 | 10/1955 | Davis | 403/122 |
| 4,240,473 | 12/1980 | Leonard | 285/338 |
| 4,602,415 | 7/1986 | Garcia | 29/273 |

FOREIGN PATENT DOCUMENTS

| | | | |
|---|---|---|---|
| 184836 | 2/1956 | Austria . | |
| 783614 | 9/1957 | United Kingdom | 29/273 |
| 2146958A | 5/1985 | United Kingdom . | |

*Primary Examiner*—Frederick S. Schmidt
*Assistant Examiner*—David A. Holmes
*Attorney, Agent, or Firm*—Handal & Morofsky

[57] ABSTRACT

This arrangement for mounting disk wheels on motor vehicles has at least one sleeve 1 slippable over a wheel bolt 6, a mounting lever being pivotably attachable at the end of the sleeve 1.

The sleeve 1 has at least one detachable insert 3, whose outer diameter is adapted to the inner diameter of the sleeve 1 and whose inner diameter is adapted to the diameter of the wheel bolt 6 so that the same sleeve can be used for wheel bolts of different diameters. (FIG. 5)

13 Claims, 4 Drawing Sheets

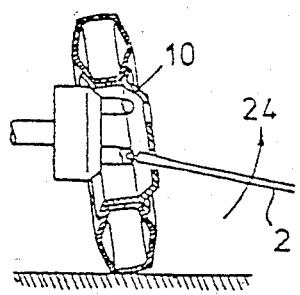 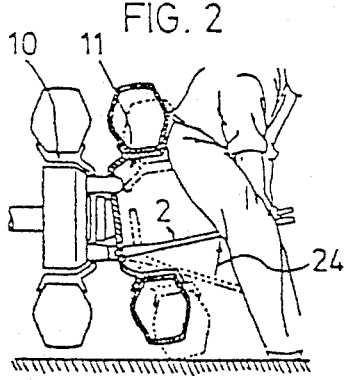 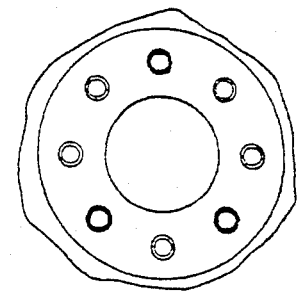
FIG. 1  FIG. 2  FIG. 3
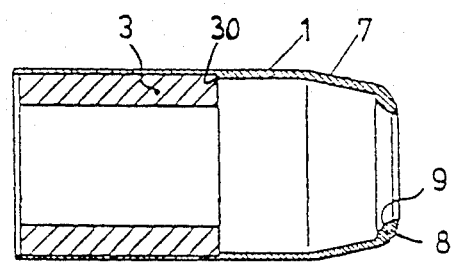
FIG. 4
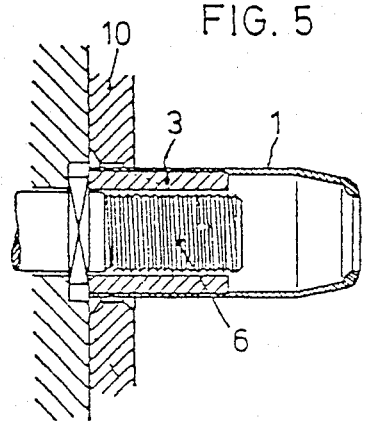 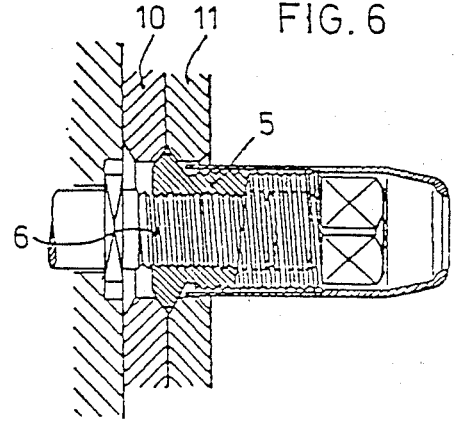
FIG. 5  FIG. 6
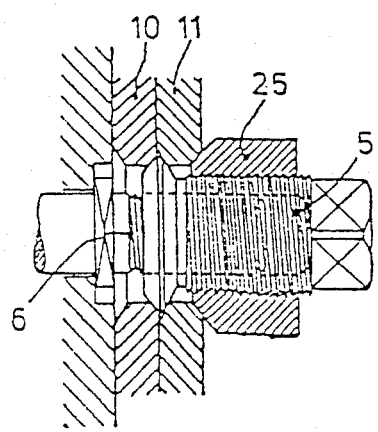
FIG. 7

ARRANGEMENT FOR MOUNTING DISK WHEELS ON MOTOR VEHICLES

The invention relates to an arrangement for mounting disk wheels on motor vehicles and having at least one sleeve slidable over a wheel bolt, a mounting lever being pivotably attachable at the free end of the sleeve.

From Austrian Patent No. 184,836 an arrangement of this kind is known. This arrangement has, however, the disadvantage that separate sleeves must be available for wheel bolts of different diameters.

The invention aims at avoiding this disadvantage and has as its object to provide an arrangement of the initially defined kind, which serves for protecting the thread of the wheel bolt and which is easily adaptable to wheel bolts of different diameters.

According to the invention, this object is achieved in that the sleeve has a detachable insert whose outer diameter is adapted to the inner diameter of the sleeve and whose inner diameter is adapted to the diameter of the wheel bolt, the inner diameter of the sleeve substantially corresponding to the diameter of the outer thread of an inner nut onto which the sleeve can be slipped, and the inner diameter of the insert substantially corresponding to the diameter of the wheel bolt onto which the sleeve is slidable with the insert, and that the mounting lever has a constant diameter cam carrying a locking means for preventing disengagement of the mounting lever and the sleeve in any inclined end position of the mounting lever.

Suitably the sleeve on its inside has a shoulder getting into contact with the detachable insert for supporting the insert. The shoulder is formed through an abrupt change of the interior diameter of the sleeve.

The sleeve according to the invention is also particularly useful in those cases where an unproportionately wide diameter difference prevails between the bolt thread diameter and the wheel attachment bore. In this case the sleeve with its insert causes centering of the wheel.

In order to enable work with the mounting levers hitherto common also in case of larger bolt and sleeve diameters, the sleeve is preferably conically designed at its free and, the rim being retracted at an acute angle to the sleeve axis, rounded towards inside and forming a thickened bead, thus saving material and weight.

To prevent the sleeve from slipping off the wheel bolt which might result in injuring the fitter or in damaging the thread, suitably the sleeve is provided with a friction-increasing coating at its inner surface or with a friction-increasing surface, wherein an insert preferably made of plastics material is provided with friction-increasing means, e.g. ribbing, furrows or the like, at its inner and/or outer surface.

Suitably the locking means of the mounting lever are provided in the form of a shoulder projecting from the surface of the constant diameter cam, wherein the side face of the shoulder forms a notch with the surface of the constant diameter cam.

For enabling a simple slipping on of the wheel by lifting the mounting lever, the constant diameter cam is connected with the mounting lever via a neck portion, the neck portion being conically designed and the smaller diameter of this neck portion following upon the constant diameter cam, wherein preferably the front face of the mounting lever facing the constant diameter cam is grooved and that groove verges into the neck portion.

According to a preferred embodiment, the constant diameter cam is delimited in a manner known per se by torus faces, which are enveloping surfaces of circles having differing radii, but the same centers, the ratio of the radii being approximately 6.375 to 10.625.

For a simple mounting of wheels with driven motor vehicle axles having an exterior planetary gear, suitably the mounting lever is curved in a region near the conically expanded end.

Figure 12:
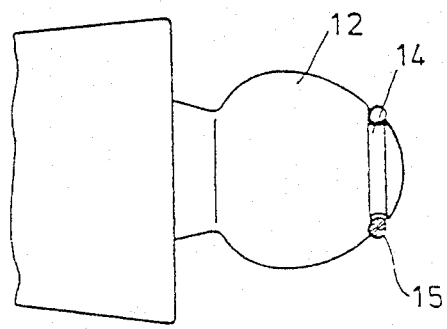
Figure 13:
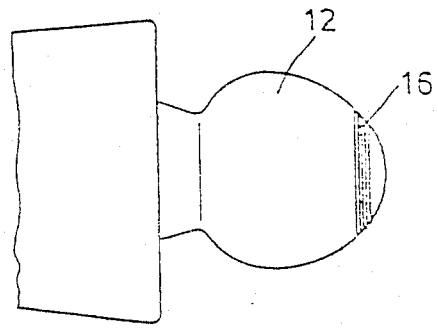
Figure 9:
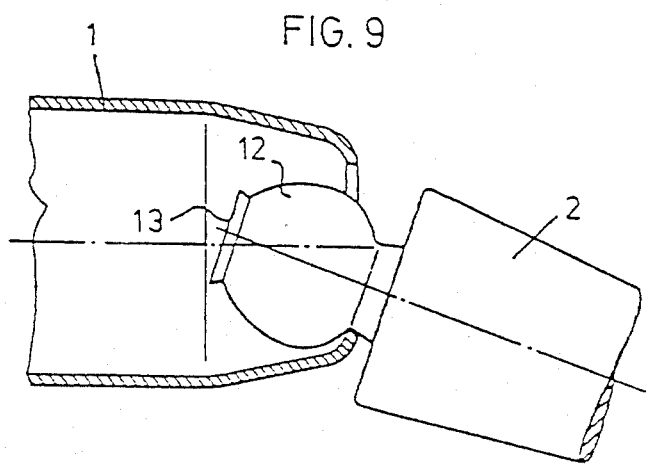
Figure 10:
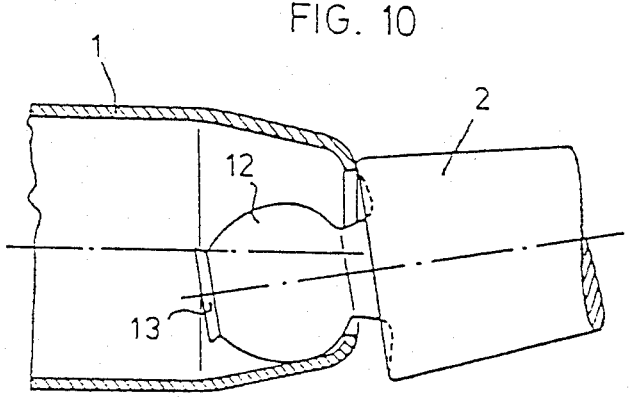
Figure 11:
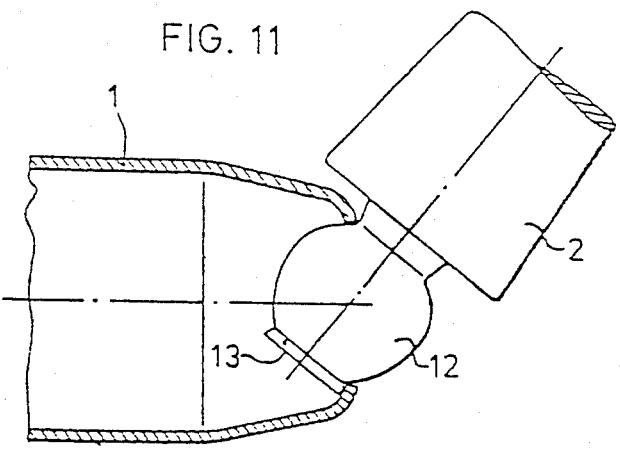
Figure 14:
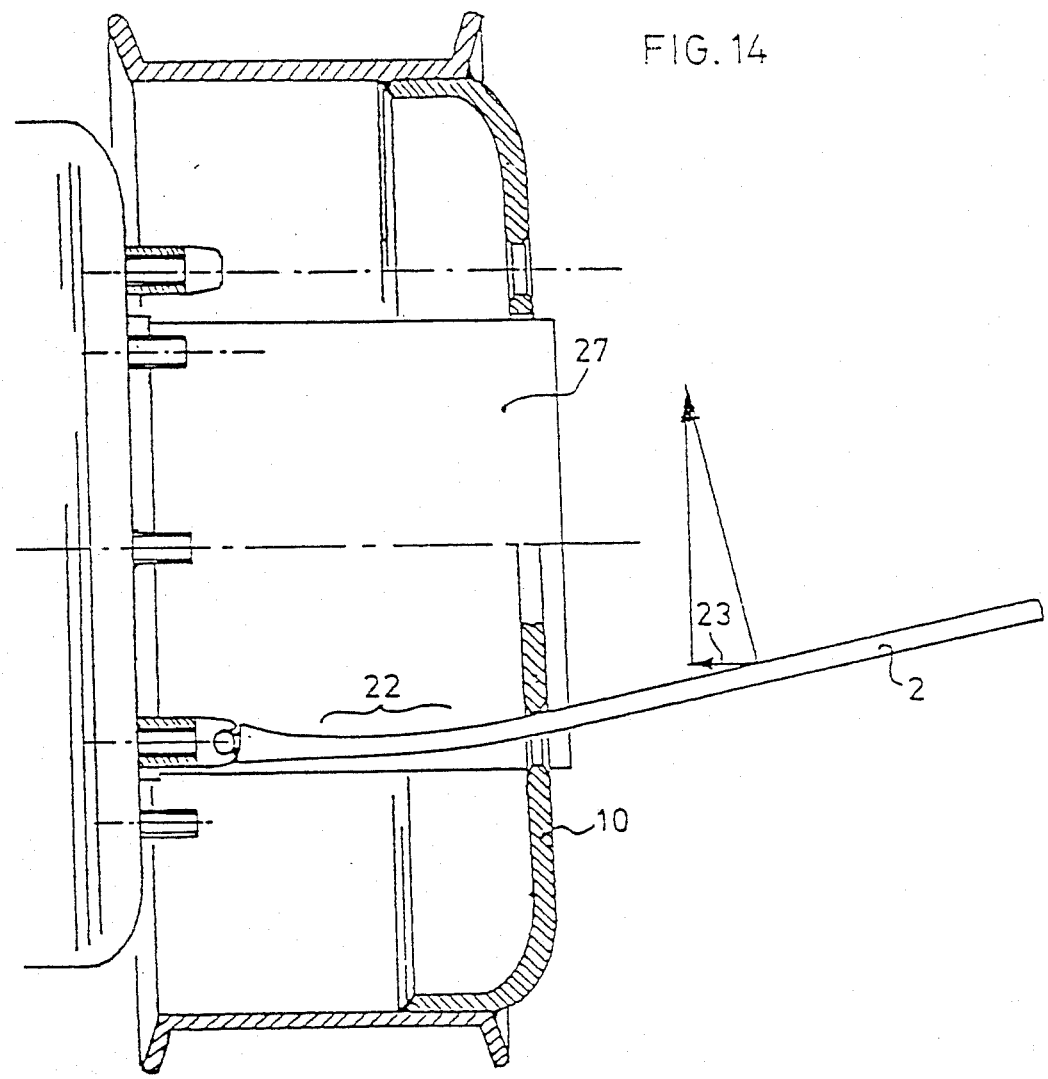

The invention will now be described in more detail with reference to the accompanying drawings, wherein FIGS. 1 to 3 schematically illustrate the arrangement of the sleeves and the mounting procedure. FIG. 4 shows a section through a sleeve according to the invention. FIGS. 5 to 7 illustrate the procedure when mounting the wheels, in illustrations analogous to FIG. 4. FIG. 8 shows a partially sectioned mounting lever. FIGS. 9 to 11 illustrate various positions of the mounting lever in the sleeve while mounting a wheel. FIGS. 12 to 14 show in illustrations each analogous to FIG. 8 various embodiments of mounting levers.

FIGS. 1 and 2 give a survey in a more schematical illustration and show the manner of mounting known per se. The mounting levers 2 are introduced through the wheel fastening bores of the loosely leaning wheel 10 and, by simple insertion, articulately connected with the sleeves slipped onto the wheel fastening bolts. By lifting the mounting lever 2 in the direction of arrow 24, the wheel 10 slides over the sleeves 1 into the respective position of use. Therein the sleeves 1 prevent damage to the thread of the wheel bolt in a manner known per se. Furthermore, also a centering of the wheel bore on the bolts is effected thereby. The most common arrangement therefor of the preferably three sleeves 1 is schematically visible in FIG. 3.

The structural details and the procedure of wheel mounting according to the invention are apparent from FIGS. 5 to 7; For mounting a single wheel or an inner wheel 10, at first the sleeves 1 with insert 3 are slipped onto the wheel bolts 6 as can be seen from FIG. 5, and the wheel 10, as has already been described above, is slipped on by means of the mounting lever 2. Thereupon the wheel is fixed by means of wheel nuts or by means of inner nuts 5, the sleeves with their inserts 3 are removed and the remaining wheel bolts that now become free are provided with the remaining inner nuts 5.

Now the outer wheel 11 is slipped onto the outer threads of the inner nuts 5 in analogous manner, by using the sleeves 1 without inserts. Now the outer wheel 11 is also being fixed by means of outer nuts 25, whereupon the sleeves 1 are removed and the remaining outer nuts 25 are screwed tight in their place, as becomes apparent from FIG. 7. Sequence and tightening-torque when tightening, as well as a periodical re-tightening of the nuts 5, 25 must be effected each in accordance with the safety regulations of the motor vehicle or wheel producer.

Dismounting of the wheels is effected simply in the opposite order of the above-listed measures.

An advantage of using the arrangement according to the invention is the absolute thread protection of all wheel fastening threads, which is also indicated for reasons of traffic safety, since only such the tightening torque required can be compiled with and excessive tightening of the wheel nuts frequently occurring in practice can be avoided.

The invention is not limited to the exemplary embodiment illustrated according to FIG. 4. Basically, the invention also includes the idea of providing such a mounting sleeve—be it one having the conically tapering shoulder illustrated, be it one having the cylindrical shape hitherto common—with a detachable insert, wherein the insert may serve for adjustment to the most varying wheel bolt diameters. Shoulder 30 supports insert 3 when the insert is in position in the sleeve. At its inner side the sleeve 1 may be provided with a friction-increasing coating or other friction-increasing provisions.

The same also holds true for the inner side and the outer side of the insert 3.

A further characteristic of the invention is the conical design of the end 7 of the sleeve 1. Thus also with larger bolt thread and sleeve diameters it is possible to use the mounting levers hitherto common, which is material and weight saving.

The retracted diameter of the rim 8 follows upon the constant diameter cam 12 of the mounting lever 2 in the working position. According to a further characteristic of the invention, the constant diameter cam 12 has a shoulder 13 that is substantially perpendicular to the longitudinal axis of the mounting lever 2. The side face 17 of the shoulder 13 facing the mounting lever 2 forms an edge with the front torus face of the constant diameter cam 12.

As also illustrated—particularly in FIG. 8—the front face 19 of the mounting lever 2 is grooved, the groove 26 verging into the conically designed neck portion 18 that in turn carries the constant diameter cam 12.

FIGS. 9 to 11 illustrate various positions of the mounting lever 2 in relation to the sleeve 1. As already said above, the sleeve 1 is located on a wheel bolt during the mounting procedure, which wheel bolt is not illustrated in FIGS. 9 to 11. FIG. 9 shows the starting position, substantially corresponding to FIG. 1. Thereupon the lever 2 is lifted in the direction of arrow 24 in FIG. 1, resulting in a position according to FIG. 10, in which the wheel can be slipped onto the sleeves and thus over all the wheel bolts. For aiding this slipping-on-movement it often is necessary to further lift the mounting lever 2 such that it also gets into positions illustrated in FIG. 11. At that further upward-pivoting of the mounting lever 2, the rim 8 of the sleeve 1 slides by at the wall of the groove 26 without being hampered, the mounting procedure thus not being impaired by any possible wedging between mounting lever 2 and sleeve 1. With the mounting levers hitherto known, there was a danger in this position (FIG. 11) of the constant diameter cam 12 becoming disengaged with the sleeve 1. Particularly with sleeves having a conically tapering end 7 this may possibly result in a sliding off of the wheel that has not yet been completely slipped on, so that the mounting procedure must be repeated. Furthermore there is the danger that a sliding-off wheel may injure the person mounting it. These dangers are prevented by the shoulder according to the invention. As clearly illustrated in FIG. 11, in this uppermost pivot position, the shoulder 13 is form-lockingly of force-lockingly supported by the head 9 of the sleeve 1. The mounting lever 2 cannot be further pivoted upwards, and a disengagement between the constant diameter cam 12 and the sleeve 1 has become impossible.

In an analogous manner, this holds also true for the lowermost pivot end position of the mounting lever 2, the shoulder 13 preventing the mounting lever 2 from falling off as soon as it is released by the person mounting the wheel. With reference to FIG. 8 it can further be said that the constant diameter cam 12 is delimited in a manner known per se by torous faces, which are enveloping surfaces of two circles having different radii but a common center, the ratio of the radii 20, 21 being approximately 6.375 to 10.625.

It goes without saying that the shoulder 13 may also be designed as a locking means in a form different from that shown in FIG. 8. FIG. 12 thus shows an embodiment in which these locking means are provided as a groove 14, a snap ring or spring ring 15 possibly being inserted in this groove. According to FIG. 13, furrows 16 or also elevated wrinklings are provided, in the same way acting as locking means.

The invention is not restricted to the exemplary embodiments illustrated. The sleeve 1 may also have a bead-like reinforcement at its narrowed rim 8 which serves for stability purposes and furthermore guarantees an unreleasable engagement of the shoulder 13 of the constant diameter cam 12 in the outermost inclined position of the mounting lever 2. The locking means could also be provided by arranging a particularly rough working material at the end of the constant diameter cam 12.

According to a further characteristic of the invention, the shaft of the mounting lever 2 is curved in a region 22 near the conically expanded end. This facilitates the mounting procedure with driven motor car axles having outwardly arranged planetary gears. This detail is apparent from FIG. 14; there, the housing 27 of the gear body makes it impossible to lift the wheel substantially beyond the center line of the axle. From the curvature and thus the inclined position of the mounting lever 2 there results, however, in a known manner, a horizontal force component 23 on the inclined plane that is suitable to effect the sliding on of the wheel 10.

What I claim is:

1. An arrangement for mounting disk wheels on a hub comprising:
   (a) at least one substantially cylindrical sleeve, open at both ends, configured, dimensioned and proportioned to fit over a wheel bolt;
   (b) a detachable sleeve insert having an outer diameter allowing insertion into said sleeve and an inner diameter sufficient to allow said sleeve insert to fit over said wheel bolt;
   (c) a mounting lever pivotally attachable to an open end of said sleeve by means of a constant diameter cam;
   (d) a locking means on said cam for preventing disengagement of the mounting lever from the sleeve in any inclined end position of said mounting lever;
   (e) an inner nut with interior and exterior threads, said interior threads configured, dimensioned and proportioned to matingly engage with said wheel bolt and said exterior threads of substantially the said outer diameter of said sleeve insert, said inner nut capable of holding an inner wheel in position and allowing said wheel bolt to extend through said inner nut;
   (f) a securing nut with an interior thread configured, dimensioned and proportioned to matingly engage the exterior threads of said inner nut and capable of holding an outer wheel in position.

2. An arrangement as set forth in claim 1, comprising within the sleeve a shoulder to contact and support the detachable sleeve insert.

3. An arrangement as set forth in claim 1, wherein the sleeve is conically designed at its free end and has a rim that is retracted at an acute angle to the sleeve axis, rounded towards the inside and forms a thickened bead.

4. An arrangement as set forth in claim 1, wherein the sleeve has an inner surface with a friction-increasing coating.

5. An arrangement as set forth in claim 1, wherein the sleeve has a friction-increasing inner surface.

6. An arrangement as set forth in claim 1, wherein the insert has at least one of inner surfaces and outer surfaces provided with friction-increasing means, such as ribbing, furrows or the like.

7. An arrangement as set forth in claim 6, wherein the insert is made of plastics material.

8. An arrangement as set forth in claim 1, wherein the locking means of the mounting lever is formed by a shoulder projecting from the surface of the constant diameter cam, the shoulder having a side face forming a notch with the surface of the constant diameter cam.

9. An arrangement as set forth in claim 1, comprising a neck portion to connect the constant diameter cam with the mounting lever, the neck portion being conically designed and the smaller diameter of said neck portion following upon the constant diameter cam.

10. An arrangement as set forth in claim 9, wherein the mounting lever has a front face facing the constant diameter cam and said front face is provided with groove means, the groove means verging into the neck portion.

11. An arrangement as set forth in claim 1, wherein the constant diameter cam is defined by the combination of torus faces generated by the rotation of two circles about a common axis, said circles having a common center, radii in the ratio of approximately 3 to 5, and said common axis in the range of about one-third the radius of the smaller circle in distance from the common center.

12. An arrangement as set forth in claim 1, wherein the constant diameter cam is defined by torous faces, wherein said faces are enveloping surfaces of two circles having different radii, but the same center point, the ratio of said different radii being in the range of about 6.375 to 10.625.

13. An arrangement as set forth in claim 1, wherein the mounting lever is curved in a region near its conically expanded end.

* * * * *